United States Patent [19]

Araki

[11] Patent Number: 5,822,703
[45] Date of Patent: Oct. 13, 1998

[54] PORTABLE TELEPHONE WITH DIAL KEYS AND LINE KEYS MOUNTED ON DIFFERENT SURFACES

[75] Inventor: Yoshimasa Araki, Yokohama, Japan

[73] Assignee: Canon Kabushiki Kaisha, Tokyo, Japan

[21] Appl. No.: 779,981

[22] Filed: Dec. 23, 1996

Related U.S. Application Data

[63] Continuation of Ser. No. 321,047, Oct. 6, 1994, abandoned.

[30] Foreign Application Priority Data

Oct. 8, 1993 [JP] Japan .................................. 5-253153
Oct. 8, 1993 [JP] Japan .................................. 5-253155

[51] Int. Cl.$^6$ ........................................................ H04Q 7/00
[52] U.S. Cl. .......................... 455/550; 379/368; 341/22; D14/138; D14/147
[58] Field of Search ..................... 455/550, 90; 379/368, 379/369, 370, 433; D14/138, 140, 145, 147, 148, 150, 151, 244, 247, 240; 341/22, 27; 345/168; 235/145 R, 1 D

[56] References Cited

U.S. PATENT DOCUMENTS

| D. 265,735 | 8/1982 | Fukushima et al. | D14/247 |
|---|---|---|---|
| D. 311,916 | 11/1990 | Tomimatu et al. | 379/433 X |
| D. 313,413 | 1/1991 | Langton | 379/433 X |
| 3,123,676 | 3/1964 | Prescott et al. | 379/368 |
| 4,042,793 | 8/1977 | Bellenger | 379/433 X |
| 4,153,822 | 5/1979 | Ueda et al. | 379/370 |
| 4,160,136 | 7/1979 | McGough | 379/368 |
| 4,488,009 | 12/1984 | Sherman | 379/370 |
| 5,302,970 | 4/1994 | Laskso et al. | 345/168 |
| 5,307,401 | 4/1994 | Matsuda | 379/433 X |
| 5,365,570 | 11/1994 | Boubelik | 379/433 X |
| 5,517,551 | 5/1996 | Arai | 455/554 |

FOREIGN PATENT DOCUMENTS

| 1240132 | 4/1965 | Germany | 379/433 |
|---|---|---|---|
| 4017-690-A | 12/1991 | Germany | 379/58 |
| 4017690 | 12/1991 | Germany | 379/58 |

OTHER PUBLICATIONS

JP405207546A Cordless Key Telephone System—Abstract Only, Aug. 1993.
JP405160884A Cordless Telephone Set—Abstract Only, Jun. 1993.
Uniden Advertisments, Mobile Office, pp. 91 and 147, Oct. 1993.
Michael Meresman, Five Proficeint Portables, Mobile Office, p. 70, Sep. 1992.
The Front, a Hand–Held Computer, Harris Corp., Terminal System pp. 19 and 25, Sep. 19, 1988.

*Primary Examiner*—Dwayne D. Bost
*Assistant Examiner*—Tracy M. Legree
*Attorney, Agent, or Firm*—Fitzpatrick, Cella, Harper & Scinto

[57] ABSTRACT

A portable telephone has external line reception keys which are depressed to capture an external line arranged on a first outer surface of the telephone body and dial keys for call generation arranged on the opposite outer surface of the telephone body. Key protection projections are provided for at least one of the external line keys and the dial keys.

2 Claims, 4 Drawing Sheets

FIG. 11
FIG. 12
FIG. 13
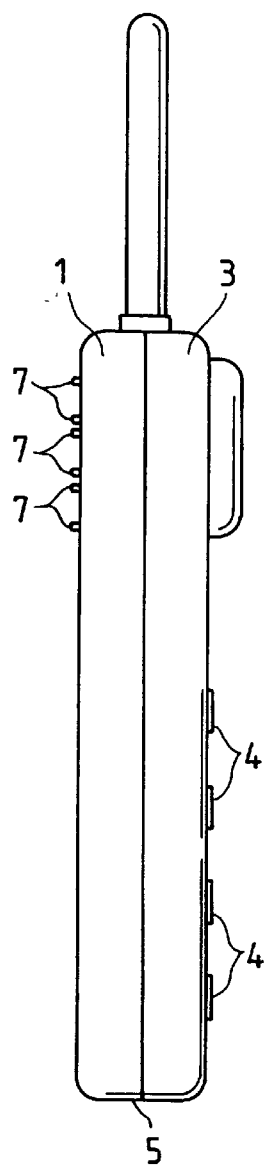
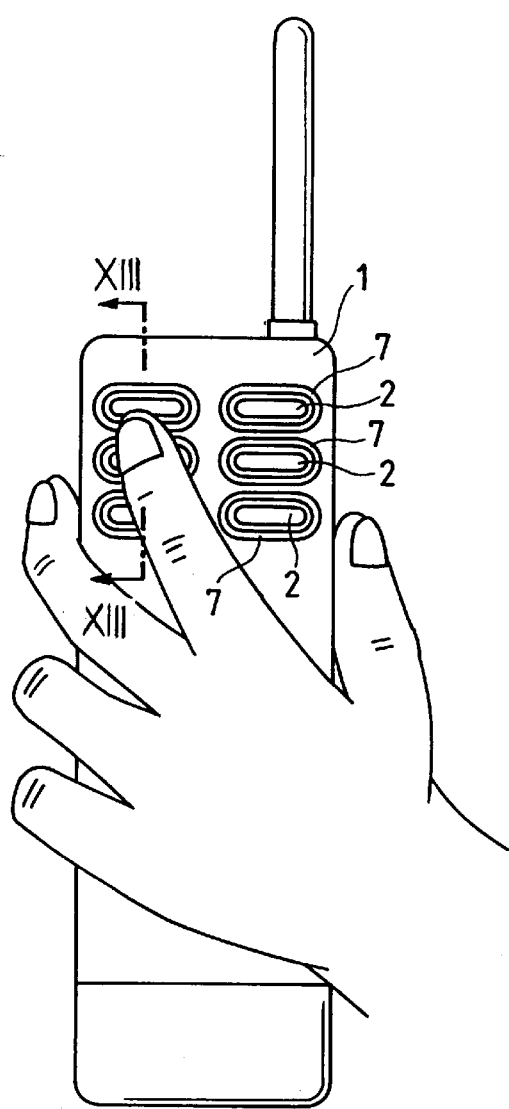
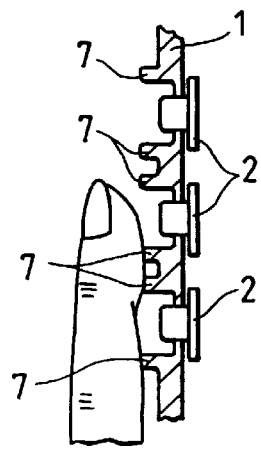

PORTABLE TELEPHONE WITH DIAL KEYS AND LINE KEYS MOUNTED ON DIFFERENT SURFACES

This application is a continuation of application Ser. No. 08/321,047 filed Oct. 6, 1994, now abandoned.

BACKGROUND OF THE INVENTION

1. Field of the Invention

The present invention relates to a portable telephone and, more particularly, to the improvement of an external structure of a portable telephone of the type in which keys or buttons are operated while holding the telephone in one hand when using.

2. Related Background Art

According to a conventional portable telephone, as shown in FIGS. 1 to 3, a portable telephone main body 5 is formed by combining an upper casing 1 and a lower casing 3.

According to a key arrangement of the portable telephone, external line reception keys 2 and keys 4 are arranged on the surface in which the operation can be performed from the same direction of the lower casing 3, so that the user operates the external line reception key 2 and the key 4 from the same direction.

According to the key arrangement of the conventional portable telephone as mentioned above, since a volume of the portable telephone has recently been decreased, the area to arrange the keys also decreases and surface area of each key and intervals among the keys decrease. There is, consequently, a problem such that it is difficult for the user to discriminate and press each key.

SUMMARY OF THE INVENTION

It is an object of the present invention to solve the above drawbacks and to arrange keys having different use objects on two surfaces which cannot be operated from the same direction.

Another object of the invention is to prevent an erroneous operation of keys by constructing such that the user doesn't erroneously press the keys.

BRIEF DESCRIPTION OF THE DRAWINGS

FIG. 11 is a side elevational view of the portable telephone shown in FIG. 9;

FIG. 12 is a diagram showing a using state of the user of the portable telephone shown in FIG. 9; and FIG. 13 is an enlarged cross sectional view taken along the line XIII—XIII in FIG. 12.

DETAILED DESCRIPTION OF THE PREFERRED EMBODIMENTS

[First embodiment]

Figure 4:
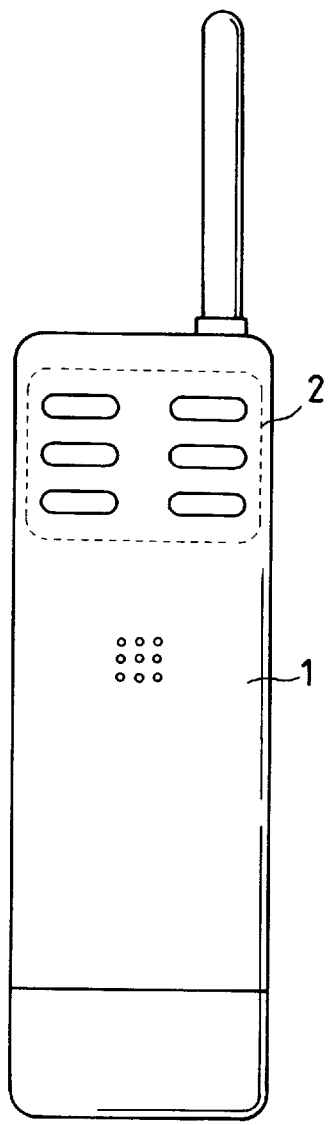
FIG. 4 is a front view of a portable telephone according to the first embodiment of the invention.
Figure 5:
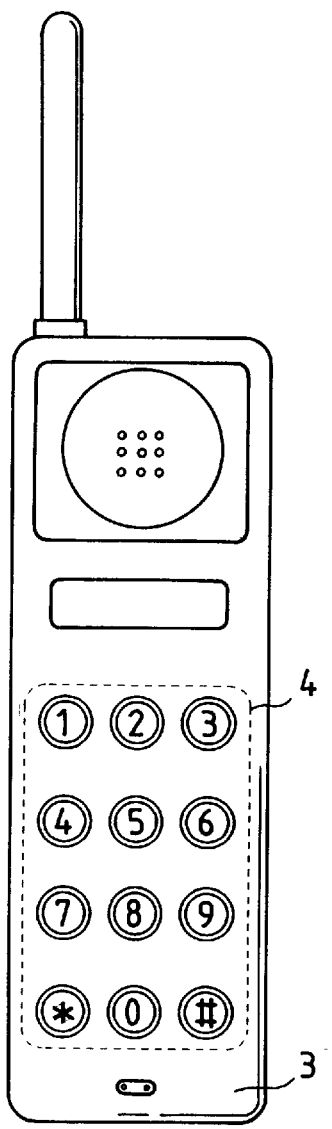
FIG. 5 is a back view of the portable telephone shown in FIG. 4.
Figure 6:
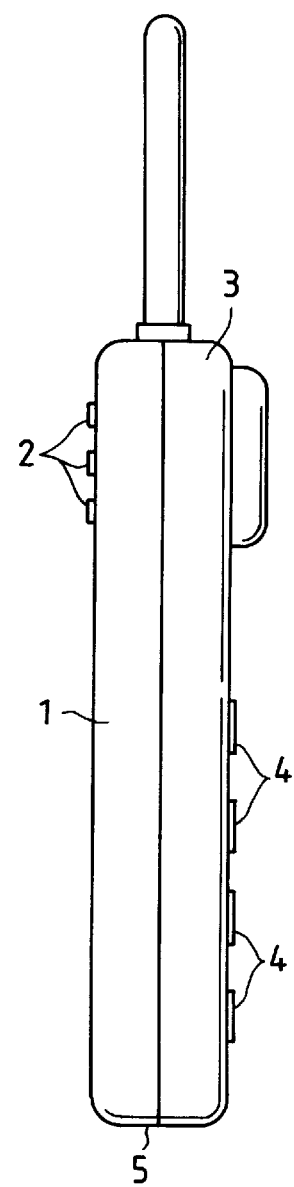
FIG. 6 is a side elevational view of the portable telephone shown in FIG. 4.

The first embodiment of the invention will be described hereinbelow with reference to FIGS. 4, 5, and 6. FIG. 4 shows a front view of a portable telephone to which the invention is applied. FIG. 5 shows a back view of the portable telephone. FIG. 6 shows a side elevational view of the portable telephone.

In FIG. 4, the external line reception keys 2 are arranged on the outer surface of the upper casing 1. The user sets the direction of the arranging surface of the external line reception keys 2 in a direction such that the external line reception key 2 can be always recognized. When receiving the external line, the user depresses a desired external line reception key 2 set in the direction such that it can be recognized, thereby capturing the external line and executing a speech communication. As shown in FIG. 5, the dial keys (ten-key) 4 other than the external line reception keys are arranged on the outer surface of the lower casing 3. When the user executes a call generation, the user sets the direction of the arranging surface of the dial keys 4 to the direction in which the user can recognize the key and depresses the dial keys 4, thereby performing the call generation. FIG. 6 shows the relation between the upper casing 1 and the lower casing 3. The main body 5 of the portable telephone is formed by combining the upper casing 1 and the lower casing 3. It will be understood from FIG. 6 that the external line reception keys 2 and the dial keys 4 are separately arranged on the two surfaces which cannot be operated from the same direction of the main body 5.

Figure 1:
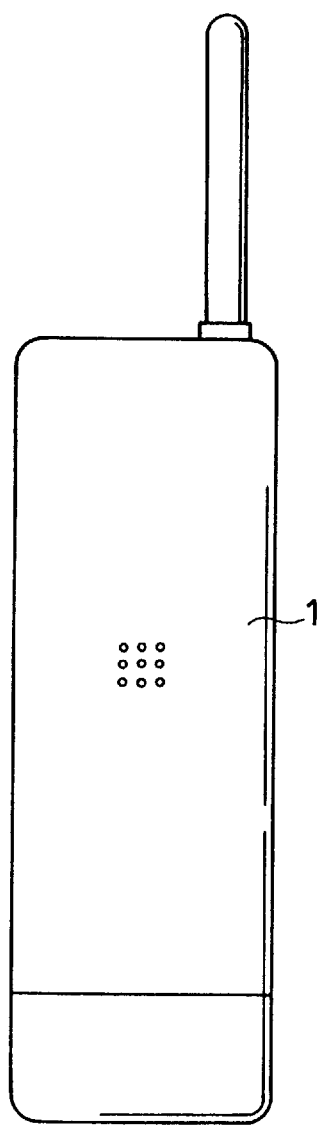
FIG. 1 is a front view of a conventional portable telephone.
Figure 2:
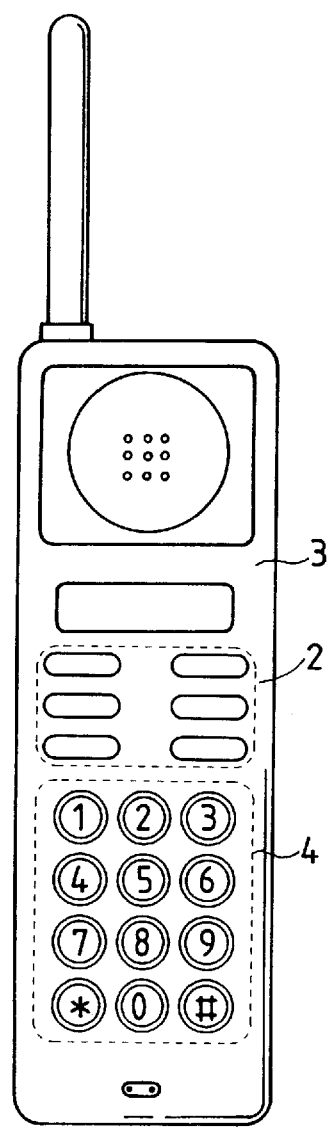
FIG. 2 is a back view of the portable telephone shown in FIG. 1.
Figure 3:
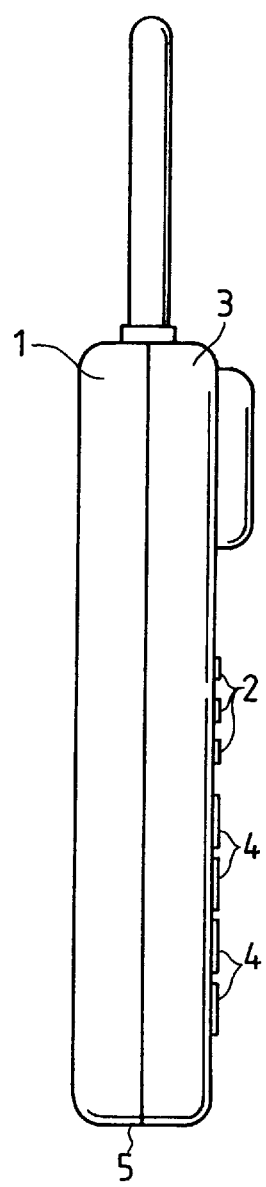
FIG. 3 is a side elevational view of the portable telephone shown in FIG. 1.

When FIGS. 4 and 5 each showing the key arrangement of the portable telephone of the invention are compared with FIGS. 1 and 2 each showing the key arrangement of the conventional portable telephone, it will be understood that the area to arrange the keys and the intervals among the keys in case of the portable telephone of the invention are wider than those of the conventional one so long as the same external dimensions are maintained.

[Second embodiment]

Figure 7:
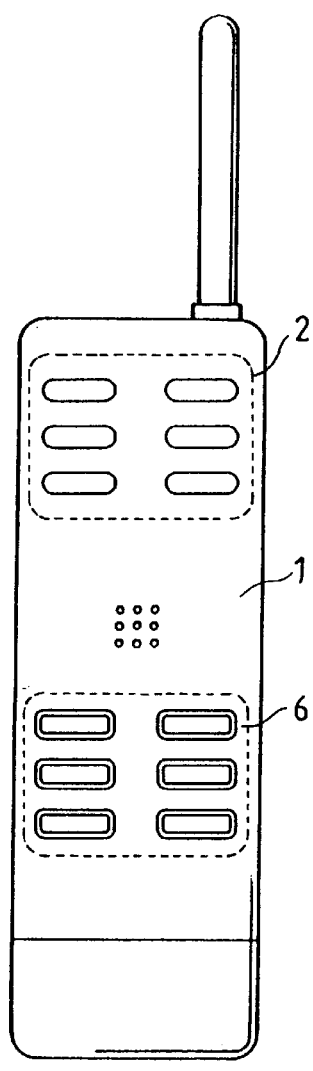
FIG. 7 is a front view of a portable telephone according to the second embodiment of the invention.
Figure 8:
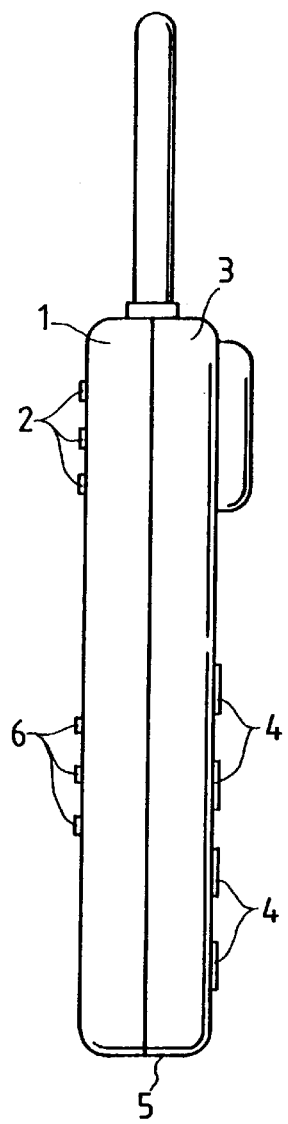
FIG. 8 is a side elevational view of the portable telephone shown in FIG. 7.

The second embodiment of the invention will now be described with reference to FIGS. 7 and 8. According to the second embodiment, one-touch keys 6 are arranged on the same surface as that of the external line reception keys 2 on the outer surface of the upper casing 1 of the main body 5. The telephone number of the speech communication partner is previously registered for each of the one-touch keys 6. By depressing a desired one-touch key, the telephone number of the speech communication partner corresponding to the depressed one-touch key, is automatically call-generated. Since the other constructions of the second embodiment are substantially similar to those of the first embodiment, their descriptions are omitted here. FIG. 7 shows a front view of the main body 5 and FIG. 8 shows a side elevational view. A back view is similar to that of FIG. 5.

[Third embodiment]

According to the third embodiment of the invention, as mentioned above, a convex portion higher than a vertex portion of each key is formed around the keys. Accordingly, it is avoided that a part of the fingers of the user comes over the key during the use of the portable telephone. Therefore, by the convex portion, it is possible to prevent that the finger of the user is come into contact with the key. It is, consequently, possible to prevent that the user erroneously depresses the key and that the telephone erroneously operates.

Figure 9:
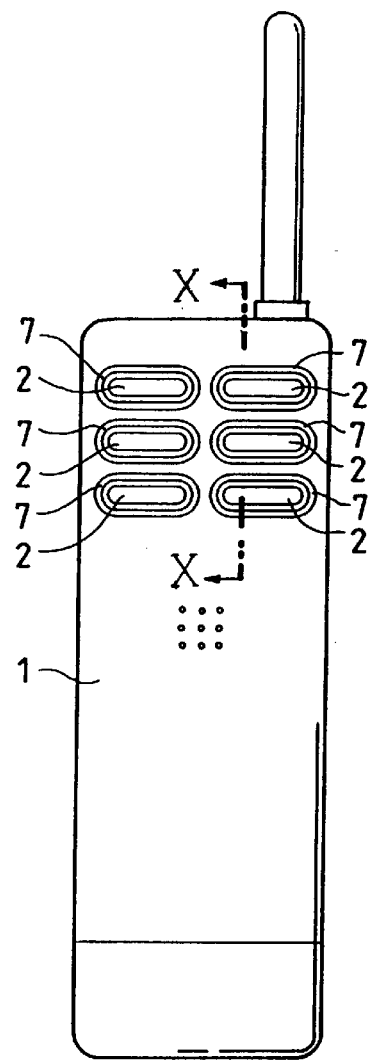
FIG. 9 is a front view of a portable telephone according to the third embodiment of the invention.
Figure 10:
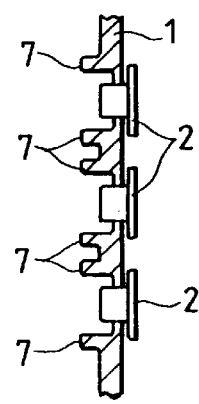
FIG. 10 is an enlarged cross sectional view of a key section taken along the line X—X in FIG. 9.

FIGS. 9 to 11 show a construction of a portable telephone of the third embodiment of the invention. FIG. 9 is a front view showing an upper casing side. FIG. 10 is an enlarged diagram taken along the line X—X in FIG. 9. FIG. 11 is a right side elevational view. A back view is similar to FIG. 5. The portable telephone of the embodiment has: the external line reception keys 2 one of which is mainly depressed and used at the time of the external line reception; and the dial keys 4 which are mainly used at the time of the call generation. The external line reception keys 2 and the dial keys 4 are separately arranged on two surfaces 1 and 2 which cannot be operated from the same direction of an external view of the portable telephone main body 5.

Reference numeral 7 denotes ribs of annular convex portions molded on the upper casing 1 so as to have a form adapted to surround the periphery of each of the plurality of external line reception keys 2 on the upper casing 1. The height of rib 7 is higher than a height of vertex portion of each external line reception key 2 as shown in FIG. 11 and FIG. 10 of the cross sectional view taken along the line X—X in FIG. 9. That is, the ribs 7 are formed so that a projection distance from the telephone outer surface (upper casing 1) of the rib 7 is to larger than a projection distance from the telephone outer surface 1 of the external line reception key 2.

As shown in FIG. 11, the main body 5 of the portable telephone is formed by combining the upper casing 1 and the lower casing 3. The external line reception keys 2 and the dial keys 4 are separately arranged on the front and back surfaces of the main body.

FIG. 12 shows the relation between the fingers of the user and the external line reception keys 2 when the user uses the portable telephone of the embodiment. FIG. 13 is an enlarged diagram of a main section taken along the line XIII—XIII in FIG. 12. When the user uses the portable telephone, since he grasps the telephone in one hand (left hand), there is a case where a part of the fingers (for example, forefinger) of the user comes over the external line reception key 2 as shown in FIG. 12. However, according to the embodiment, as mentioned above, since each of the external line reception keys 2 is arranged so that its height is fairly lower than the height of rib 7, the user hardly erroneously depresses the external line reception key 2 owing to the convex-shaped ribs 7. Namely, it is possible to prevent that the finger of the user erroneously comes into contact with the key 2. The erroneous operation of the key can be effectively prevented.

Although the annular ribs 7 have been shown as an example in the embodiment, its shape is not limited to such a shape. Since it is sufficient that the ribs can prevent the erroneous depression of the key 2, the ribs 7 can also have a shape adapted to surround a part of the periphery of the key or a series of dot-shaped convex portions so long as the above object can be accomplished. It will be also obviously understood that it is effective to provide such ribs for the other keys such as dial keys 4 as necessary without limiting to the external line reception keys 2.

As described above, the external line reception keys which are mainly depressed and used at the time of the external line reception and the dial keys which are mainly used at the time of the call generation are separately arranged on two outer surfaces which cannot be operated from the same direction of the portable telephone. Thus, there are effects such that areas to arrange the external line reception keys and dial keys can be increased, a surface area of each key can be increased, intervals among the keys can be widened, and a discriminating performance and an operability of each of the external line reception keys, dial keys, and the like are improved.

According to the invention as described above, since the convex portion higher than the vertex portion of each key is formed around the key having a fear such that a part of the fingers of the user comes over the key during the use of the portable telephone, it is possible to prevent by the convex portion that the finger of the user is come into contact with the key. Consequently, a typical effect such that it is possible to prevent that the user erroneously depresses the key and the telephone erroneously operates is obtained.

What is claimed is:

1. A portable telephone comprising:

a telephone main body whose external surfaces are formed by a front surface, a back surface and side surfaces;

external line reception keys which are depressed and used for external line connection and are arranged on one of the front surface and the back surface of said telephone main body;

dial keys which are used at the time of a call generation and are arranged on a different one of the front surface and the back surface of said telephone main body on which the external line reception keys are arranged; and a key protection section which is provided on at least one of the front surface and the back surface of said telephone main body so as to surround the external line keys, wherein said key protection section has one projecting section for each of said external line keys, said projecting section being a convex portion formed higher than a top portion of said external line keys for preventing fingers of an operator from erroneously touching said external line keys.

2. A portable telephone comprising:

a telephone main body whose external surfaces are formed by a front surface, a back surface, and side surfaces;

a first key operating section which is arranged on the front surface of said telephone main body, said first key operating section having a plurality of external line reception keys for external line connection;

a second key operating section which is arranged on the back surface of said telephone main body having dial keys used at the time of a call generation and cannot be operated from the same direction as the direction of said first key operation; and a key operation protecting section for protecting said first key operating section which is arranged on the front surface of said telephone main body, said key operation protecting section having one projecting section for each of said plurality of external line reception keys and said projecting section being a convex portion formed higher than a top portion of said external line reception keys for preventing fingers of an operator from erroneously touching said external line reception keys.

* * * * *